United States Patent Office 3,497,494
Patented Feb. 24, 1970

---

3,497,494
REACTIVE MONOAZO DYESTUFFS CONTAINING TWO TRIAZINE GROUPS
Richard Budziarek, Manchester, England, assignor to Imperial Chemical Industries Limited, Millbank, London, England, a corporation of Great Britain
No Drawing. Filed Mar. 14, 1966, Ser. No. 533,791
Claims priority, application Great Britain, Mar. 29, 1965, 13,260/65; Feb. 21, 1966, 7,492/66
Int. Cl. C09b 62/08; D06p 3/58, 1/38
U.S. Cl. 260—153                                7 Claims

ABSTRACT OF THE DISCLOSURE

Water-soluble reactive monoazo dyestuffs of the formula:

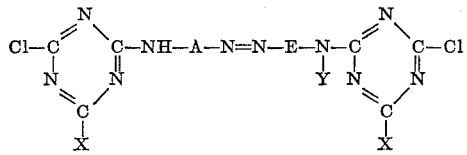

wherein
Y stands for a hydrogen atom or an alkyl group of up to four atoms;
A represent sulphophenyl;
E represents a hydroxy mono-sulphonaphthylene or hydroxy di-sulphonaphthylene radical;
one X is a

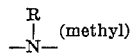

radical, where R is sulphophenyl or sulphonaphthyl, and the other X represents $CH_3O$, or a $NH.R'$ radical, where R' is hydrogen or a benzene or naphthlene radical that may be substituted.
These dyestuffs have a remarkably high fixation on cellulose fibres.

---

This invention relates to new water-soluble reactive azo dyestuffs, to the methods of preparation thereof and to the use of such dyestuffs for colouring textile materials.

It is known to use dyestuffs containing halogeno-s-triazine groups for the purpose of colouring fibres containing hydroxyl groups, especially cellulose materials such as cotton and viscose rayon.

These dyestuffs readily fix on such materials with good fastness to wet processing, since the halogeno-s-triazine group is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogeno-s-triazine group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unreacted dyestuff. The wastage of dyestuff and extra processing make the dyeing or printing process more expensive, especially when deep shades are required.

The present invention is concerned with the production of water-soluble halogeno-s-triazine reactive dyestuffs which have a remarkably high fixation on the fibre and for which washing-off treatments can be reduced considerably.

According to the invention there are provided monoazo dyestuffs of the formula:

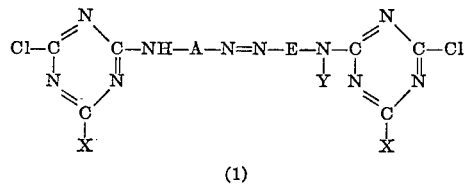

wherein Y stands for a hydrogen atom or an alkyl group of up to 4 carbon atoms; A stands for the residue of a diazo component; E stands for a hydroxynaphthalene radical connected to the azo group in ortho position to the hydroxyl group and having at least one sulphonic acid group; one X stands for a

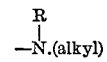

radical, where R represents a substituted benzene or naphthalene radical, and the other X stands for $CH_3O$ or for a $NH.R'$ radical where R' represents a hydrogen atom or a benzene or naphthalene radical which may be substituted.

The radical A can represent, for example a disulphonaphthylene such as 1,5-disulpho-3,7-naphthylene, radical but preferably represents a sulphophenylene radical, above all a 4-sulpho-1,3-phenylene radical.

The radical E preferably represents a 3-sulpho-1-hydroxy-2-naphthyl radical in which the N atom is attached to the 6, 7 or 8 position of the naphthalene nucleus and which may contain a second sulphonic acid group in the 5- or 6-position of the naphthalene nucleus.

The alkyl radical in X, when X stands for

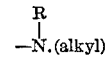

is preferably a methyl group. R preferably represents a sulphophenyl radical having the sulpho group meta or para to the nitrogen atom. R' preferably represents a phenyl group having at least one sulphonic acid group attached thereto, and which may also contain one or more $CH_3$, $CO_2H$, Cl or $CH_3O$ substituents, more especially phenyl groups having a sulpho group meta or para to the nitrogen atom.

According to a further feature of the invention, there is provided a process for manufacture of the monoazo dyestuffs of Formula 1 which comprises coupling a diazotised amine of the formula:

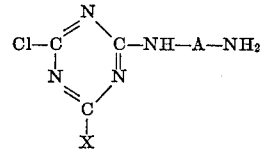

with a coupling component of the formula:

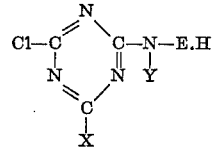

the symbols A, E, X and Y having the meanings stated above.

The amines of Formula 2 and the coupling components of Formula 3 in which X stands for a methoxy group can be obtained by reacting 2-methoxy-4,6-dichloro-s-triazine with a diamine $NH_2$—A—$NH_2$ or an aminonaphthol H.E—NHY.

The amines of Formula 2 and the coupling components of Formula 3 in which X stands for a

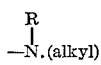

or NHR' group can be obtained by reacting one mole of cyanuric chloride with one mole of a diamine of formula $NH_2.A.NH_2$ or aminonaphthol of formula H.E—NHY and with one mole of a compound

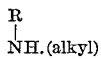

or $NH_2R'$ as the case requires. Example of suitable compounds for these purposes include:

Diamines $NH_2$—A—$NH_2$: 1,3-phenylene-diamine-4-sulphonic acid, 1,4-phenylene-diamine-2-sulphonic acid and 2,6-diaminonaphthalene-4,8-disulphonic acid.

Aminonaphthols H.E—NHY: 1,8-aminonaphthol-3,5-, 3,6- and 4,6-disulphonic acid, 1,8-aminonaphthol-4-sulphonic acid, 2,5-aminonaphthol-7-sulphonic acid and 1,7-disulphonic acid, 2,8-aminonaphthol-6-sulphonic acid and 3,6-disulphonic acid, 1,5-aminonaphthol-7-sulphonic acid and the N-methyl, N-ethyl, N-propyl and N-butyl derivatives of these aminonaphthols.

Compounds of formula

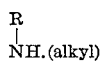

N-methylaniline -3- and 4-sulphonic acid, 1-N-methyl-aminonaphthalene-4-sulphonic acid and 2-N-methylamino-naphthalene-6-sulphonic acid.

Compounds of formula $NH_2R'$: Ammonia, aniline, aniline sulphonic acids and derivatives thereof having substituents on the benzene nucleus, e.g. orthanilic, methanilic and sulphanilic acids, -2,5- and 3,5-disulphonic acids, 2-aminotoluene-4- and 5-sulphonic acids and 4,5-disulphonic acid, 4-aminotoluene-2- and 3-sulphonic acids and 2,5-disulphonic acid, 3-aminotoluene-4- and 6-sulphonic acids, anthranilic -4- and 5-sulphonic acids, 4-methoxyaniline-2-sulphonic acid, 4-chloroaniline-3-sulphonic acid, 2-, 3- and 4-aminotoluene, 2-, 3- and 4-nitroaniline, 2-, 3- and 4-chloroaniline, 2- and 4-methoxyaniline, 3-aminoacetanilde-4-sulphonic acid, 4-aminoacetanilide-3-sulphonic acid, 3-amino-5-sulpho-salicylic acid, 4- and 5-aminosalicylic acids, anthranilic acid, 4- and 5-sulphoanthranilic acids, 1,3-diaminobenzene-4-sulphonic acid, 1,4-diaminobenzene-3-sulphonic acid, aniline-3- and 4-sulphamic acid, 1- and 2-aminonaphthalene and any of the 1- and 2-aminonaphthalene-sulphonic acids and their derivatives, e.g. 2-amino-naphthalene-6-sulphonic acid.

According to a further feature of the invention there is provided a process for manufacture of the dystuffs of Formula 1 which comprises reacting an amine of the formula:

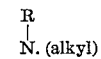

with an azo compound of the formula:

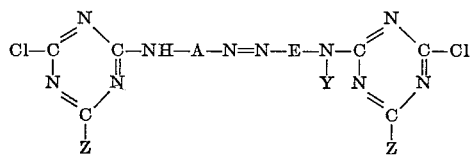

in which A, E and Y have the meanings stated above, one Z stands for a chlorine atom and the other Z stands for $OCH_3$ or a group of formula NHR' where R' has the meaning stated above.

The compounds of Formula 4 can be obtained by the following methods:

(1) Condensing a diamine of formula $NH_2$—A—$NH_2$ with 1 mole of cyanuric chloride, diazotising the amine so obtained and coupling with a coupling component of Formula 3 above in which E and Y have the meanings stated above but X can have the meanings $OCH_3$ or NHR' only.

(2) Diazotising an amine of the Formula 2 above wherein A has the meaning stated above but X stands for $OCH_3$ or NHR' only, and coupling with a coupling component of Formula 3 wherein E and Y have the meanings stated above, but X stands for a chlorine atom, these coupling components being obtained by reacting an aminonaphthol of formula H.E—NHY with one mole of cyanuric chloride.

(3) Diazotising an amine of the Formula 2 above wherein A has the meaning stated above but X stands for $OCH_3$ or NHR' only, and coupling under alkaline conditions (pH 8 to 8.5) with an aminonaphthol of formula: H.E—NHY, and reacting the product so obtained with cyanuric chloride.

(4) By forming an azo compound of the formula:

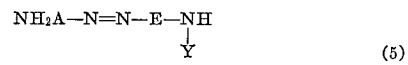

e.g. by a method hereinafter described, reacting with one mole of a compound of formula:

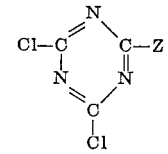

where Z stands for $OCH_3$ or NHR' and then reacting the product with one mole of cyanuric chloride.

According to a further feature of the invention there is provided a process for manufacture of the dyestuffs of Formula 1, other than those containing a methoxy group on one of the triazine nuclei, which comprises reacting a compound of formula $NH_2R'$ where R' has the meaning stated above with an azo compound of Formula 4 above in which one Z stands for a chlorine atom and the other Z stands for a group of the formula:

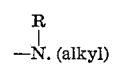

The azo compounds of Formula 4 used in this process can be obtained by the following methods:

(1) Condensing a diamine of formula $NH_2$—A—$NH_2$ with 1 mole of cyanuric chloride, diazotising the amine so obtained and coupling with a coupling component of Formula 3 above in which E and Y have the meanings stated above but X stands for a

group.

(2) Diazotising an amine of Formula 2 above in which X stands for

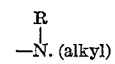

and coupling with a coupling component of Formula 3 in which X stands for a chlorine atom.

(3) Diazotising an amine of Formula 2 above in which X stands for

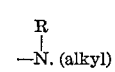

and coupling under alkaline conditions (pH 8 to 8.5) with an aminonaphthol of formula: H.E—NHY, and condensing the product so obtained with cyanuric chloride.

(4) By forming an azo compound of Formula 5 e.g. by a method hereinafter described, reacting with one mole of a compound of the formula:

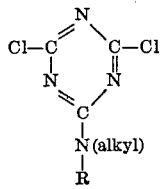

where R has the meaning stated above, and then reacting the product with 1 mole of cyanuric chloride.

According to yet a further feature of the invention there is provided a process for manufacture of the dyestuffs of Formula 1 which comprises reacting a monoazo compound of the Formula 5 in which A, E and Y have the meanings stated above, with 1 mole of each of two different compounds of the formula:

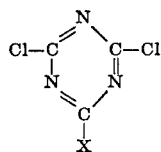

(6)

in which the two symbols X have the meanings stated above.

The compounds of Formula 5, can be obtained by diazotising an amine of the formula: $Acyl.NH$—$A$—$NH_2$ or $NO_2$—$A$—$NH_2$, coupling with a coupling component of the formula:

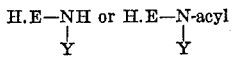

the symbols A, E and Y having the meanings stated above, and hydrolysing and/or reducing as necessary to convert the acylamino or nitro group or groups into amino.

As examples of amines of the above formula, there may be mentioned 4- and 5-acetylaminoaniline-2-sulphonic acids, 4- and 5-nitroaniline-2-sulphonic acids, 2-acetylamino - 6 - aminonaphthalene-4,8-disulphonic acid and 3- and 4-acetylaminoaniline.

As examples of coupling components of the formula

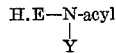

there may be mentioned: 2-N-methylacetylamino-5-naphthol-7-sulphonic acid, or any other N-acetyl derivative of the compounds named above under the heading "Aminonaphthols H.E.—NHY."

The new dyestuffs can be used for dyeing or printing a wide variety of textile materials. They are particularly valuable for use as reactive dyes for cellulose with which they are capable, in the presence of acid-binding agents, of reacting with a high degree of efficiency. However, according to the particular choice of components, the new dyestuffs can be adapted to be of particular value for dyeing rather than printing and vice versa. Thus by using intermediate compounds such that at least one of the radicals Z and A, preferably Z contains a naphthalene nucleus, and keeping the number of sulphonic acid groups relatively few, dyestuffs are obtained which are pre-eminently suitable for dyeing from long liquors. On the other hand, dyestuffs more suitable for printing than dyeing can be obtained by having any aromatic nuclei in A and Z a benzene nucleus and by increasing the number of sulphonic acid groups to improve water-solubility.

The invention is illustrated, but not limited by the following examples in which parts are by weight:

EXAMPLE 1

A solution of 7.4 parts of cyanuric chloride in 32 parts of acetone is added slowly to 40 parts of water at 0–4° C. to form a fine suspension. A solution of the sodium salt of 7.5 parts of 1,3-diaminobenzene-4-sulphonic acid in 120 parts of water is then added slowly to the suspension with stirring at 0–4° C. and the reaction mixture is stirred at 0–4° C. until all the 1,3-diaminobenzene-4-sulphonic acid has reacted. The pH is adjusted to 6–7 by the addition of aqueous sodium carbonate solution and a solution of the sodium salt of 7.5 parts of 2-aminotoluene-4-sulphonic acid in 100 parts of water is added. The reaction mixture is heated to 35–40° C. and stirred for several hours at 35–40° C., the pH being adjusted to 5–6 as necessary by the addition of aqueous sodium carbonate solution, until one chlorine of the bis-chloro-triazinyl intermediate has completely reacted.

Separately, a suspension from 7.8 parts of cyanuric chloride is prepared as described above. A solution of the sodium salt of 13.2 parts of 1-amino-8-hydroxynaphthalene-3,6-disulphonic acid in 120 parts of water is added slowly at 0–4° C. and the reaction mixture is stirred at 0–4° C. for 2–4 hours until all the 1-amino-8-hydroxynaphthalene-3,6-disulphonic acid has reacted. The solution is filtered from the particles of unreacted cyanuric chloride and mixed with a solution of the sodium salt of 7.6 parts of N-methylaniline-3-sulphonic acid in 80 parts of water. The pH is adjusted to 4 and the temperature raised to 35–40° C. and the reaction mixture stirred for several hours at pH 4 until one chlorine of the bis-chloro-triazinyl intermediate has completely reacted.

The solution of the intermediate obtained by the condensation of cyanuric chloride with one mole of 1,3-diaminobenzene-4-sulphonic acid and one mole of 2-aminotoluene-4-sulphonic acid is mixed with 20 parts of 2 N sodium nitrite solution and cooled to 0° C. 12 parts of concentrated hydrochloric acid are then added quickly with vigorous stirring and the stirring is continued for 30 minutes, after which time the excess of nitrous acid is destroyed by the addition of sulphamic acid. The diazonium salt so obtained is added to the solution of the condensation product between cyanuric chloride, one mole of 1-amino-8-hydroxynaphthalene-3,6-disulphonic acid and one mole of N-methylaniline-3-sulphonic acid at 0–4° C. with stirring and the pH slowly adjusted to 7 until the coupling has been completed.

The dyestuff is precipitated by the addition of sodium chloride, filtered off, washed with aqueous sodium chloride solution and dried at 20–40° C. in vacuo.

The dyestuff having the constitution:

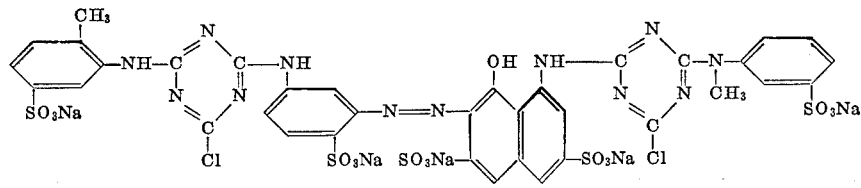

dissolves in cold water to give a bright, bluish-red solution, and prints and dyes cotton and viscose rayon in bluish-red tints. By the use of dry heat or steaming treatments in the presence of acid-binding agents, the fixation achieved with this dyestuff can exceed 95% on cotton and viscose rayon, even in strong shades.

The following table illustrates similar dyestuffs of the invention obtained by diazotising the condensation product of cyanuric chloride, a diamine (column 3) and an amine X (column 2) and coupling with the coupling component obtained by the condensation of cyanuric chloride with an aminonaphthol sulphonic acid (column 4) and an amine X' (column 5).

The percentage fixation of these dyestuffs varies from 90 to 96% on cotton and viscose.

EXAMPLE 44

Cyanuric chloride is condensed with one mole of 1,3-diaminobenzene-4-sulphonic acid and one mole of a 1:1-mixture of N-methylaniline-3- and 4-sulphonic acids following the procedure described in paragraph 1 of Example 1.

Separately, cyanuric chloride is condensed with one mole of 1-amino-8-hydroxy naphthalene-3,6-disulphonic acid as described in Example 1.

The first of these condensation products is then diazotised and coupled with the second condensation product following the procedure described in paragraph 3 of Example 1. When the coupling is complete, 35 parts of an aqueous solution of ammonia of 17% strength are

| Ex. | Amine X | Diamine | Aminonaphthol sulphonic acid | Amine X' | Shade |
|---|---|---|---|---|---|
| 2 | Aniline-3-sulphonic acid | 1,3-diaminobenzene-4-sulphonic acid. | 1-amino-8-hydroxynaphthalene-3,6-disulphonic acid. | N-methylaniline-3-sulphonic acid | Bluish-red. |
| 3 | N-methylaniline-3-sulphonic acid | do | do | Aniline-3-sulphonic acid | Do. |
| 4 | do | do | do | 2-aminotoluene-4-sulphonic acid | Do. |
| 5 | Aniline-3,5-disulphonic acid | do | do | N-methylaniline-3-sulphonic acid | Do. |
| 6 | N-methylaniline-4-sulphonic acid | do | do | Aniline-3,5-disulphonic acid | Do. |
| 7 | 2-aminotoluene-5-sulphonic acid | do | do | N-methylaniline-3-sulphonic acid | Do. |
| 8 | 1:1-mixture of N-methylaniline-4- and 5-sulphonic acids. | do | do | 2-aminotoluene-5-sulphonic acid | Do. |
| 9 | 1:1-mixture of aniline-3- and 4-sulphonic acids. | do | do | N-methylaniline-3-sulphonic acid | Do. |
| 10 | N-methylaniline-4-sulphonic acid | do | do | 1:1-mixture of aniline 3- and 4-sulphonic acids. | Do. |
| 11 | 2-aminotoluene-3(4),5-disulphonic acid. | do | do | N-methylaniline-3-sulphonic acid | Do. |
| 12 | N-methylaniline-4-sulphonic acid | do | do | 2-aminotoluene-3(4)5-disulphonic acid. | Do. |
| 13 | 2-aminonaphthalene-6-sulphonic acid. | do | do | N-methylaniline-3-sulphonic acid | Do. |
| 14 | 1-aminonaphthalene | 1,4-diaminobenzene-3-sulphonic acid. | do | do | Reddish-violet. |
| 15 | Aniline-3-sulphonic acid | do | 1-amino-8-hydroxynaphthalene-4,6-disulphonic acid. | 1-N-methylaminonaphthalene-4-sulphonic acid. | Do. |
| 16 | Aniline | 1,3-diaminobenzene-4-sulphonic acid. | do | 2-N-methylaminonaphthalene-6-sulphonic acid. | Bluish-red. |
| 17 | 2-aminonaphthalene | do | 1-amino-8-hydroxynaphthalene-3,5-disulphonic acid. | N-methylaniline-4-sulphonic acid | Do. |
| 18 | N-methylaniline-3-sulphonic acid | do | 2-amino-5-hydroxynaphthalene-1,7-sulphonic acid. | 2-aminonaphthalene-6-sulphonic acid. | Orange. |
| 19 | do | do | 2-amino-5-hydroxynaphthalene-7-sulphonic acid. | 1-aminonaphthalene-4-sulphonic acid. | Do. |
| 20 | do | do | 1-amino-8-hydroxynaphthalene-4-sulphonic acid. | do | Bluish-red. |
| 21 | do | do | 2-amino-8-hydroxynaphthalene-6-sulphonic acid. | 2-aminonaphthalene-6-sulphonic acid. | Scarlet. |
| 22 | 3-aminoacetanilide-4-sulphonic acid | do | 1-amono-8-hydroxynaphthalene-3,6-disulphonic acid. | N-methylaniline-3-sulphonic acid | Bluish-red. |
| 23 | 5-sulphoanthranilic acid | do | do | do | Do. |
| 24 | 3-amino-5-sulphosalicylic acid | do | do | do | Do. |
| 25 | N-methylaniline-4-sulphonic acid | do | do | 1,3-diaminobenzene-4-sulphonic acid. | Do. |
| 26 | do | do | do | Aniline-4-sulphamic acid | Do. |
| 27 | Aniline | do | do | N-methylaniline-3-sulphonic acid | Do. |
| 28 | 2-aminotoluene-4-sulphonic acid | 1,4-diaminobenzene-3-sulphonic acid. | do | do | Reddish violet. |
| 29 | do | do | 1-amino-8-hydroxynaphthalene-4,6-disulphonic acid. | do | Do. |
| 30 | do | 1,3-diaminobenzene-4-sulphonic acid. | do | do | Bluish-red. |
| 31 | do | do | 1-amino-8-hydroxynaphthalene-3,5-disulphonic acid. | do | Do. |
| 32 | do | do | 1-amino-8-hydroxynaphthalene-4-sulphonic acid. | do | Do. |
| 33 | N-methylaniline-3-sulphonic acid | do | 2-amino-8-hydroxynaphthalene-3,6-disulphonic acid. | 2-aminotoluene-4-sulphonic acid | Red. |
| 34 | do | do | 2-amino-5-hydroxynaphthalene-1,7-disulphonic acid. | do | Orange. |
| 35 | do | 1,4-diaminobenzene-3-sulphonic acid. | do | do | Red. |
| 36 | do | do | 2-amino-5-hydroxynaphthalene-7-sulphonic acid. | do | Red. |
| 37 | do | 1,3-diaminobenzene-4-sulphonic acid. | do | do | Orange. |
| 38 | do | do | 2-amino-8-hydroxynaphthalene-6-sulphonic acid. | do | Scarlet. |
| 39 | do | 1,4-diaminobenzene-3-sulphonic acid. | do | do | Brick-red. |
| 40 | do | do | 2-N-methylamino-8-hydroxynaphthalene-6-sulphonic acid. | do | Do. |
| 41 | do | 1,3-diaminobenzene-4-sulphonic acid. | do | do | Scarlet. |
| 42 | do | do | 2-N-methylamino-5-hydroxynaphthalene-7-sulphonic acid. | do | Orange. |
| 43 | do | 1,4-diaminobenzene-3-sulphonic acid. | do | do | Red. | added and the mixture is heated at 35–40° C. for 2–3 hours, cooled and the product is separated and dried.

The dyestuff having the constitution:

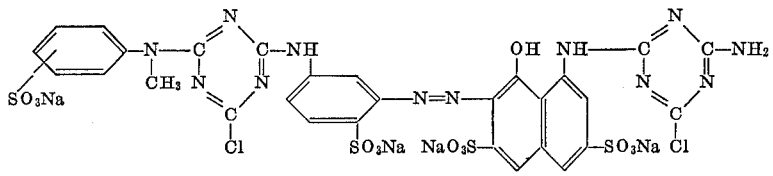

yields bluish-red prints on cotton and viscose having excellent fastness to washing and to light.

tained by the condensation of cyanuric chloride with one mole of 1-amino-8-hydroxynaphthalene-3,6 - disulphonic acid and one mole of N-methylaniline-3-sulphonic acid following the procedure described in paragraph 3 of Example 1.

The dystuff having the formaula:

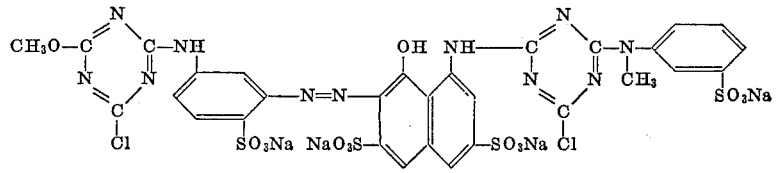

yields a bluish-red tint on cotton and viscose; fixation can exceed 95% on cotton and 90% on viscose rayon.

EXAMPLE 45

Cyanuric chloride is condensed with one mole of 1,3-diaminobenzene-4-sulphonic acid as described in Example 1, paragraph 1, and the condensation product of cyanuric chloride, one mole of 1-amino-8-hydroxynaphthalene-3,6-disulphonic acid and one mole of a 1:1-mixture of N-methylaniline-3- and 4-sulphonic acids is prepared by the procedure described in paragraph 2 of Example 1. The first condensation product is diazotised and coupled with the second following the procedure described in paragraph 3 of Example 1. As soon as the coupling is finished, 35 parts of an aquous solution of ammonia of 17% strength are added and the mixture is heated for 2–3 hours at 35–40° C., and the product isolated and dried.

The dyestuff having the constitution shown below:

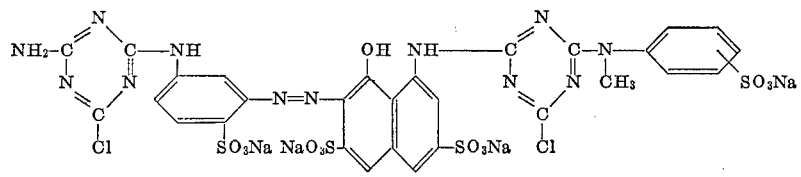

gives bluish-red prints on cotton and viscose having excellent fastness to washing and to light.

EXAMPLE 46

A solution of 7.2 parts of 2-methoxy-4,6-dichloro-s-triazine in 35 parts of acetone is added slowly to 40 parts of water below 10° C. to form a fine suspension. A solution of the sodium salt of 7.5 parts of 1,3-diaminobenzene-4-sulphonic acid in 120 parts of water is then added slowly to the suspension with stirring and the reaction mixture is stirred at 10–20° C. for several hours at pH 4 until all the 1,3-diaminobenzene-4-sulphonic acid has reacted. The product is diazotised and coupled with the product ob-

EXAMPLE 47

Cyanuric chloride is condensed with one mole of 1,3-dimainobenzene-4-sulphonic acid following the procedure described in paragraph 1 of Example 1.

Separately, a solution of 7.2 parts of 2-methoxy-4,6-dichloro-s-triazine dissolved in 35 parts of acetone is added slowly into 40 parts of water at 0–10° C. to form a fine suspension. A solution of the sodium salt of 13.2 parts 1-amino-8-hydroxynaphthalene-3,6 - disulphonic acid in 120 parts of water is then added and the mixture is stirred at 10–15° C. at pH 3.5–4 for several hours until all the 1-amino-8-hydroxynaphthalene-3,6 - disulphonic acid has reacted, sodium carbonate being added to absorb the liberated acid. The product is salted out by the addition of sodium chloride, filtered off, washed with aqueous sodium chloride solution and suspended in 300 parts of water and the mixture cooled to 0° C.

Diazotisation and coupling follows using the procedure described in paragraph 3 of Example 1.

The dyestuff having the formula:

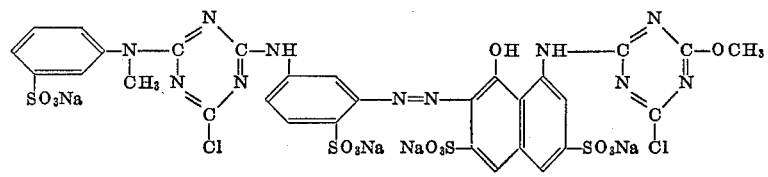

yields a bluish-red tint on cotton and viscose rayon. Fixations of 95% on cotton and 90% on viscose rayon can be achieved.

EXAMPLE 48

4-aminoacetanilide-3-sulphonic acid is diazotised and coupled with 2,5-aminonaphthol-1,7-disulphonic acid by known methods and the product is hydrolysed with dilute sodium hydroxide solution to give the compound 2-(4'-aminophenylazo)-6-amino-1-naphthol-2',3,5 - trisulphonic acid. One mole of this compound is condensed at pH 6–7 with one mole of 2,4-dichloro-6-N-methyl-(3' - sulpho) anilino-s-triazine at 20–30° C. using sodium carbonate to neutralise the liberated acid. The solution is then cooled to 0° C. and the product condensed at pH 6–7 with one mole of cyanuric chloride, using sodium carbonate as acid-binder, until the second amino-group has completely reacted. One mole of sodium salt of 2-aminonaphthalene-6-sulphonic acid is added and the mixture is heated at 30–40° C. in the presence of sodium carbonate until reaction of the amine is complete. The product is separated and dried.

The dyestuff obtained yields red tint on cotton and viscose having excellent fixation and fastness properties.

EXAMPLE 49

By using 2-acetylamino-6-aminoaphthalene-4,8 - disulphonic acid as the diazo component but otherwise following the procedure described in Example 48 a dyestuff is obtained yielding red tints on cotton and viscose and having excellent fixation and fastness properties.

EXAMPLE 50

4-aminoacetanilide-3-sulphonic acid is diazotised and coupled with acetyl-2-N-methylamino-5-naphthol-7 - sulphonic acid and the product is hydrolysed to give the compound 2-(4'-aminophenylazo)-6-methylamino-1-naphthol-2',3-disulphonic acid. One mole of this compound is condensed with one mole of 2,4-dichloro-6-N-methyl(3'-sulphon)anilino-s-triazine at 20–30° C. The reaction is completed by the condensation of the product with one mole of 2,4-dichloro-6-(6'-sulpho-2'-naphthyl)amino-s - triazine at 35–45° C. and the product is separated and dried.

The dyestuff obtained yields red tint on cotton and viscose having excellent fixation and fastness properties.

EXAMPLE 51

By using 3-aminoacetanilide-4-sulphonic acid as the diazo component and following the steps described in Example 50 a dyestuff is obtained yielding orange tints on cotton and viscose and having excellent fixation and fastness properties.

EXAMPLE 52

By using 2-acetylamino-6-aminonaphthalene-4,8 - disulphonic acid as the diazo component and following the steps described in Example 50 a dyestuff is obtained yielding red tints on cotton and viscose and having excellent fixation and fastness properties.

What I claim is:

1. A monoazo dyestuff of the formula:

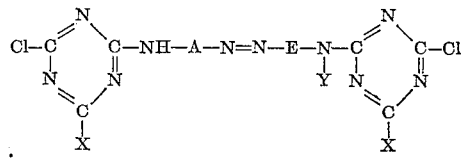

wherein
Y represents a member selected from the group consisting of a hydrogen atom and an alkyl group of up to four carbon atoms;
A represents a sulphophenyl radical;
E represents a member selected from the group consisting of hydroxy mono-sulphonaphthylene or hydroxy di-sulphonaphthylene radicals of the formula $C_{10}H_{5-n}OH(SO_3H)_n$ where $n$ is 1–2 and having the OH group ortho to the azo group;
one X represents a

radical, where R is selected from the group consisting of sulphophenyl and sulphonaphthyl and the other X is a member selected from the group consisting of $CH_3O$, and $NH.R'$ radical, wherein R' is a member selected from the group consisting of hydrogen, phenyl, naphthyl, sulphonaphthyl, sulphophenyl, disulphophenyl, sulphotolyl, disulphotolyl, acetamido-sulphophenyl, sulphocarboxyphenyl, sulphohydroxycarboxyphenyl, sulphoaminophenyl and sulphaminophenyl.

2. Monoazo dyestuffs as claimed in claim 1 wherein the radical A represents a 4-sulpho-1,3-phenylene radical.

3. Monoazo dyestuffs as claimed in claim 1, wherein the symbol R represents a sulphophenyl group having the sulphonic acid group m or p to the nitrogen atom.

4. A monoazo dyestuff as claimed in claim 1 having the formula:

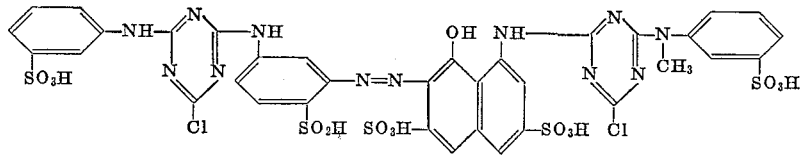

5. A monoazo dyestuff as claimed in claim 1 having the formula:

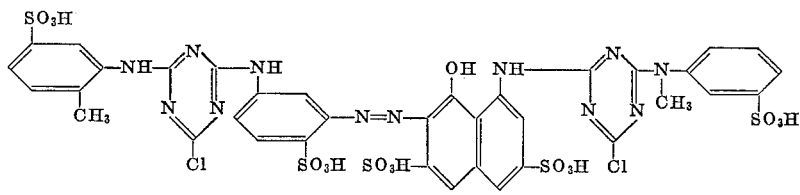

6. A monoazo dyestuff as claimed in claim 1 having the formula:

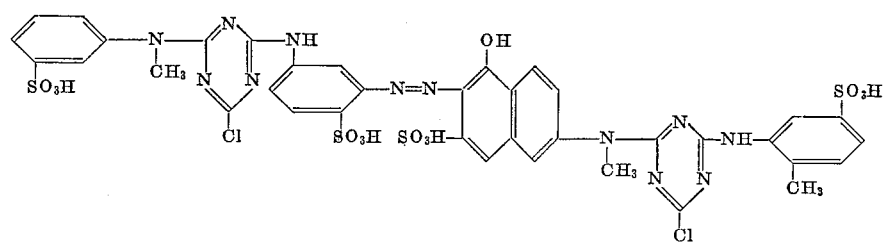

7. A monoazo dyestuff as claimed in claim 1 having the formula:
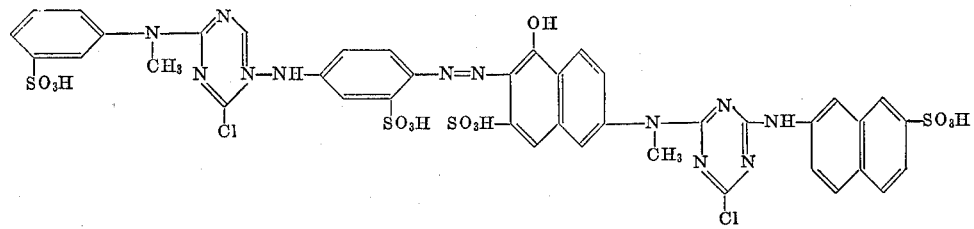
References Cited
UNITED STATES PATENTS
3,169,952   2/1965   Riat et al. _____ 260—153 XR
FLOYD D. HIGEL, Primary Examiner
U.S. Cl. X.R.
8—41, 63, 71; 260—249.8, 509, 249.5